United States Patent
Higuchi et al.

(10) Patent No.: US 9,165,374 B2
(45) Date of Patent: Oct. 20, 2015

(54) IMAGE PROCESSING DEVICE THAT PERFORMS TRACKING CONTROL

(75) Inventors: Mirai Higuchi, Hitachinaka (JP); Takehito Ogata, Hitachi (JP); Takeshi Shima, Mito (JP)

(73) Assignee: Hitachi, Ltd., Tokyo (JP)

(*) Notice: Subject to any disclaimer, the term of this patent is extended or adjusted under 35 U.S.C. 154(b) by 442 days.

(21) Appl. No.: 13/550,970

(22) Filed: Jul. 17, 2012

(65) Prior Publication Data
US 2013/0033600 A1   Feb. 7, 2013

(30) Foreign Application Priority Data
Aug. 1, 2011  (JP) .................................. 2011-167980

(51) Int. Cl.
H04N 7/18      (2006.01)
G06T 7/20      (2006.01)
G06K 9/00      (2006.01)
G06K 9/32      (2006.01)

(52) U.S. Cl.
CPC ............ G06T 7/204 (2013.01); G06K 9/00798 (2013.01); G06K 9/00805 (2013.01); G06K 9/3241 (2013.01); G06T 2207/30252 (2013.01)

(58) Field of Classification Search
CPC ................. G06T 7/204; G06T 2007/30252; G06K 9/00805; G06K 9/3241; G06K 9/00798
USPC .................. 348/118, 119, 148; 382/104, 106; 701/23–26, 28, 41, 45, 301; 340/441
See application file for complete search history.

(56) References Cited

U.S. PATENT DOCUMENTS

| 3,661,459 A * | 5/1972 | Aoki ............................. 356/5.03 |
| 4,257,703 A * | 3/1981 | Goodrich ...................... 356/4.03 |
| 5,428,439 A * | 6/1995 | Parker et al. .................. 356/5.01 |
| 5,517,412 A   | 5/1996 | Unoura |
| 6,810,330 B2* | 10/2004 | Matsuura ....................... 701/301 |
| 6,953,253 B2* | 10/2005 | Schofield et al. ............. 359/604 |
| 7,141,796 B2* | 11/2006 | Hattori et al. ............ 250/370.08 |
| 2002/0176605 A1* | 11/2002 | Stafsudd et al. .............. 382/106 |
| 2004/0022416 A1* | 2/2004 | Lemelson et al. ............ 382/104 |

(Continued)

FOREIGN PATENT DOCUMENTS

| JP | 6-68400 A | 3/1994 |
| JP | 6-229759 A | 8/1994 |

(Continued)

OTHER PUBLICATIONS

Japanese Office Action dated Jul. 15, 2014 (Three (3) pages).

Primary Examiner — Victor Kostak
(74) Attorney, Agent, or Firm — Crowell & Moring LLP

(57) ABSTRACT

An image processing device which performs a tracking control with respect to a moving object which is travelling forward, based on the controlled variable of the own vehicle includes, an image processing unit which specifies an area of a moving object from an input image, sets the specified area of the moving object as a reference image area after starting tracking control, and sets an area of the moving object after a predetermined time as a comparison image area; a comparison unit which compares the set reference image area and the comparison image area with each other, and calculates travelling information relating to the moving object; and a controlled variable calculation unit which calculates a controlled variable of the own vehicle from travelling information which is calculated in the comparison unit.

9 Claims, 8 Drawing Sheets

(56) References Cited

U.S. PATENT DOCUMENTS

| | | |
|---|---|---|
| 2004/0054473 A1 | 3/2004 | Shimomura |
| 2007/0021876 A1 | 1/2007 | Isaji et al. |
| 2007/0053584 A1* | 3/2007 | Nagaoka et al. ............. 382/154 |
| 2007/0071311 A1* | 3/2007 | Rovira-Mas et al. ......... 382/154 |
| 2008/0065287 A1* | 3/2008 | Han et al. ...................... 701/28 |
| 2008/0069399 A1* | 3/2008 | Nagao et al. .................. 382/103 |
| 2008/0122604 A1* | 5/2008 | Hattori et al. ................. 340/441 |
| 2008/0164985 A1* | 7/2008 | Iketani et al. ................. 340/435 |
| 2008/0240508 A1* | 10/2008 | Nakao et al. .................. 382/107 |
| 2009/0147996 A1* | 6/2009 | Peng ............................. 382/106 |
| 2009/0184845 A1* | 7/2009 | Saito ............................. 340/937 |
| 2010/0104199 A1* | 4/2010 | Zhang et al. .................. 382/199 |

FOREIGN PATENT DOCUMENTS

| | | |
|---|---|---|
| JP | 7-85257 A | 3/1995 |
| JP | 2004-112144 A | 4/2004 |
| JP | 3872638 B2 | 1/2007 |
| JP | 2007-272461 A | 10/2007 |
| JP | 2010-143578 A | 7/2010 |

* cited by examiner

IMAGE PROCESSING DEVICE THAT PERFORMS TRACKING CONTROL

BACKGROUND OF THE INVENTION

1. Field of the Invention

The invention relates to an image processing device which performs image processing.

2. Background Art

In recent years, in-vehicle cameras have been developed and are becoming widespread for supporting driving. These cameras not only show a user an image, but also are provided with a function for automatically detecting a lane mark, or vehicles using imaging processing, and in which a function of preventing an accident of a vehicle departing from the lane mark, or a function of following a preceding vehicle has been developed. In general, in order to execute these two functions, radar equipment such as a mill wave radar, or a laser radar, and the in-vehicle camera are used. There is a problem of high cost since two types of sensors are used.

Therefore, a technology is required in which a function of executing a tracking control, and lane mark keeping is executed only using an image obtained from the camera. As a technology of performing the tracking control only using an image obtained from a camera, a method which is described in JP-A-2002-74598 has been proposed.

In the method, the width of a preceding vehicle on an image at a certain time t is obtained, and is registered as an amount of standard characteristics, the width of the preceding vehicle on the image which is obtained at a time t+N thereafter is obtained, and the speed of the vehicle is controlled so as to match the amount of standard characteristics. For example, when the width of the preceding vehicle on the image at time t is 20 pixels, and the width of the preceding vehicle on the image at time t+N is 25 pixels, it is possible to execute the tracking control by controlling the speed of the own vehicle to be lowered, since the own vehicle is close to the preceding vehicle.

SUMMARY OF THE INVENTION

However, in the method in JP-A-2002-74598, it is necessary to obtain the width of the preceding vehicle on the image. In addition, there is a problem that it is difficult to detect a minute change of the magnitude of the preceding vehicle on the image.

An object of the present invention is to provide an image processing device in which it is possible to obtain an accurate parameter from a minimal change of an image, and to execute a precise tracking control of a preceding vehicle using only image information from an imaging device.

According to an aspect of the invention, there is provided an image processing device which performs tracking control based on the controlled variable of the own vehicle with respect to a moving object which is travelling forward, and includes, an image processing unit which specifies an area of a moving object from an input image, sets the specified area of the moving object as a reference image area after starting the tracking control, and sets an area of the moving object after a predetermined time as a comparison image area; a comparison unit which compares the set reference image area and the comparison image area with each other, and calculates travelling information relating to the moving object; and a controlled variable calculation unit which calculates the controlled variable of the own vehicle from travelling information which is calculated in the comparison unit.

According to another aspect of the invention, there is provided an image processing device which performs travelling control within lane marks based on the controlled variable of the own vehicle, and includes, an image processing unit which detects the lane marks on the road from an input image, sets an area of the detected lane mark as the reference image area, and sets an area of the lane mark after a predetermined time as a comparison image area; a comparison unit which compares the set reference image area and the comparison image area with each other, and calculates a translation component of the image, and a rotation parameter of the image; and a controlled variable calculation unit which calculates a controlled variable of turning of the own vehicle from a translation component of the image, and the rotation parameter of the image which are calculated in the comparison unit.

According to the aspects of the invention, it is possible to provide an image processing device in which it is possible to obtain an accurate parameter from a minute change of an image, and to execute a precise tracking control of a preceding vehicle using only image information from an imaging device.

DETAILED DESCRIPTION OF THE INVENTION

Hereinafter, embodiments of the invention will be described with reference to drawings.

First Embodiment

Figure 1:
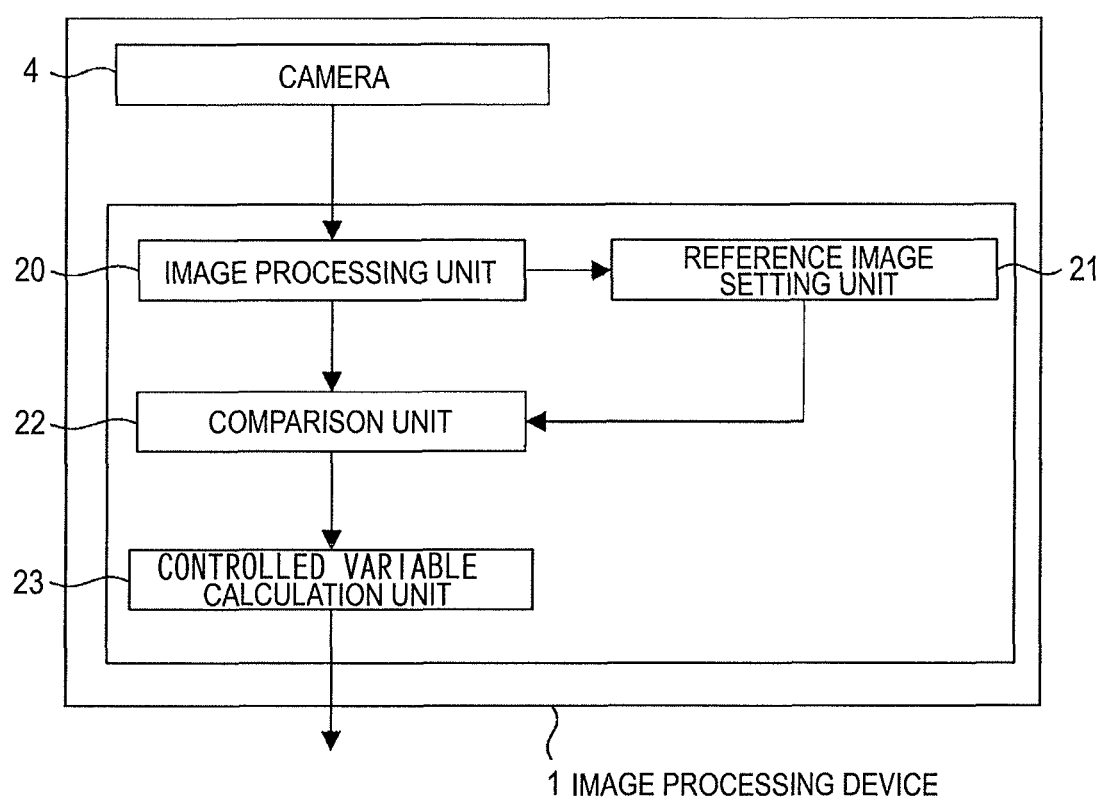
FIG. 1 is a block diagram which shows an embodiment of an image processing device according to the invention.

FIG. 1 is a block diagram which shows an example of a basic configuration of an image processing device 1 according to a first embodiment of the invention. Detailed descriptions will be made later.

The first embodiment is a control method of the image processing device 1 which performs processing with respect to an image read from a camera 4 as an imaging device, and performs a tracking control of a preceding vehicle as a moving object which is travelling in front of the own vehicle based on the controlled variable of the own vehicle.

Figure 2:
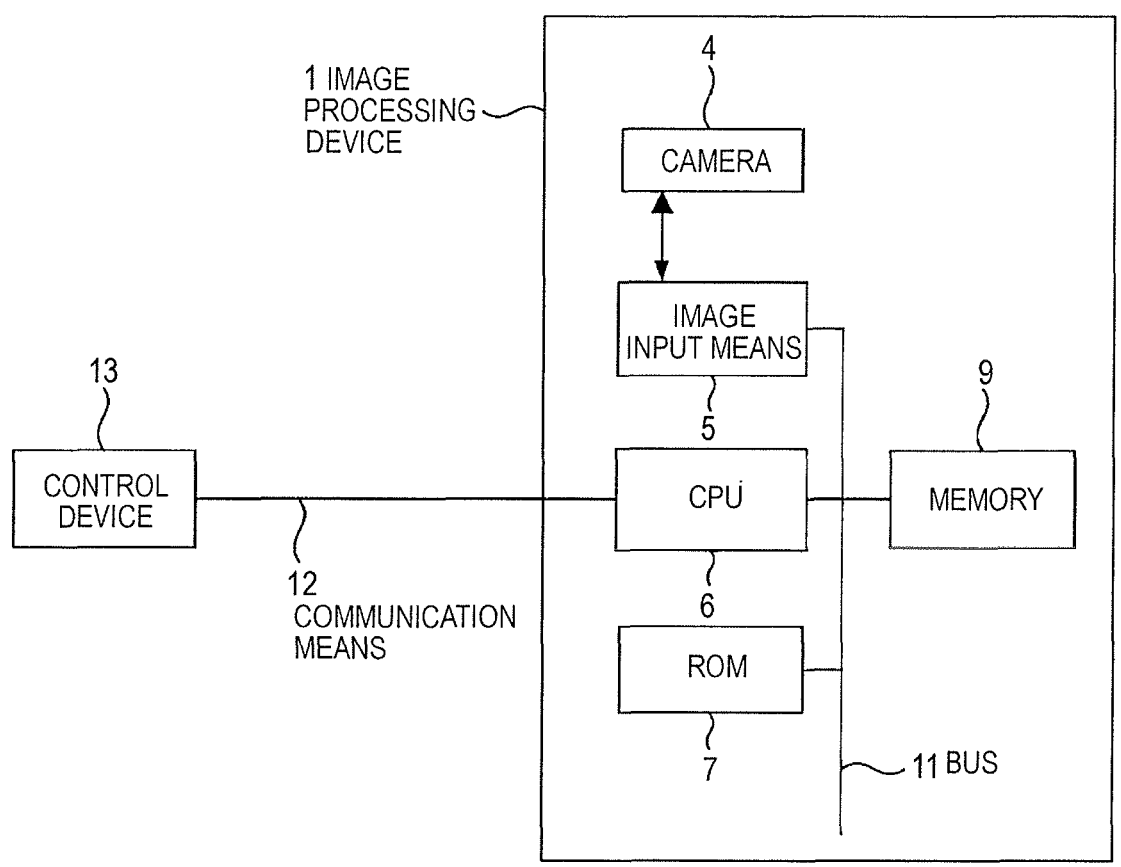
FIG. 2 is a diagram which shows a configuration example of an image processing system in which an image processing device according to the invention is used.

The image processing device 1 according to the invention is applied to the image processing device 1 and a control device 13 as shown in FIG. 2, images the surrounding environment using the camera 4 (imaging device) included in the image processing device 1, performs processing of an image, and executes a function of controlling a vehicle.

Figure 3:
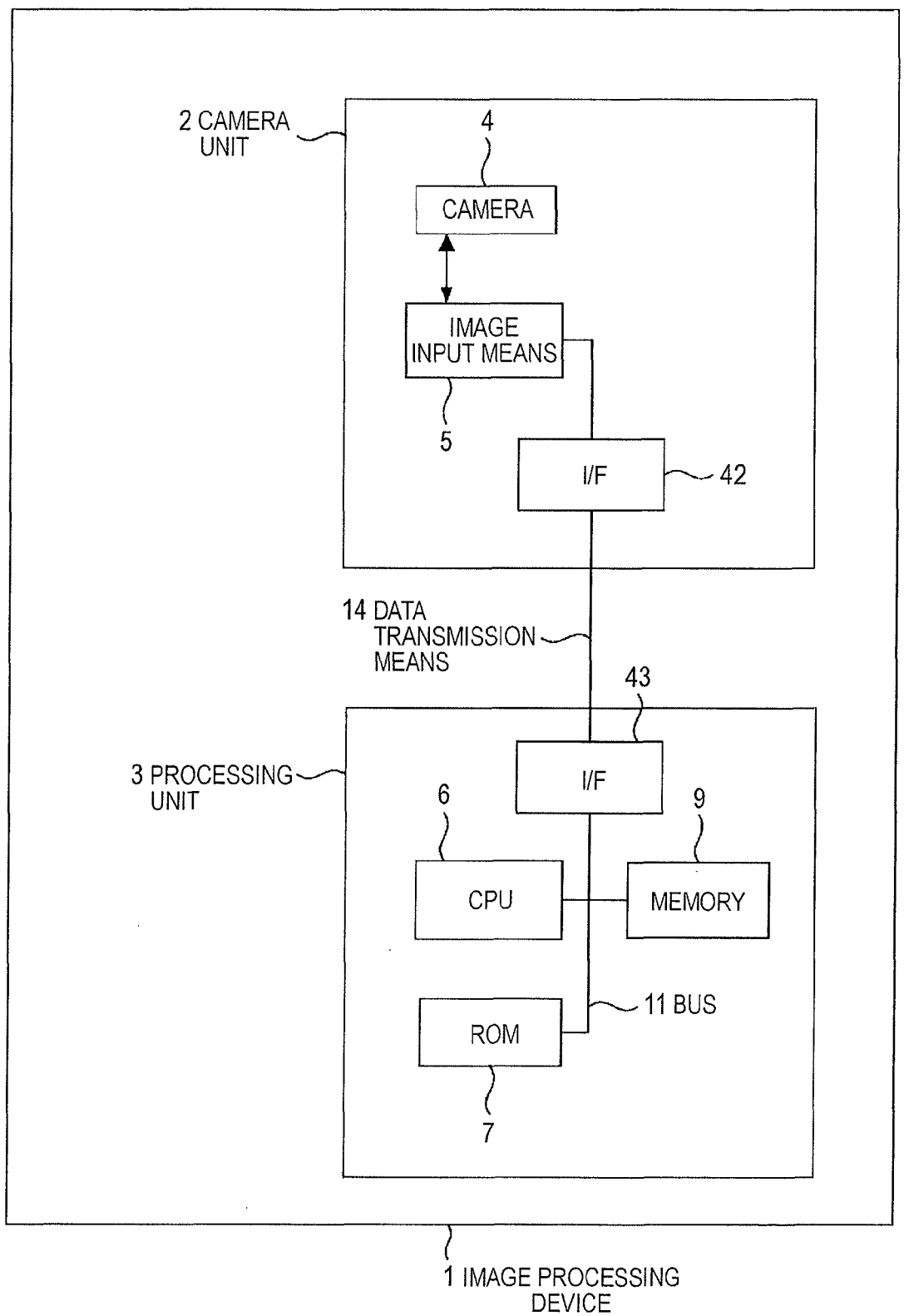
FIG. 3 is a diagram which shows another configuration example of the image processing system in which the image processing device according to the invention is used.

At this time, the image processing device 1 may be provided with two or more cameras. In addition, as shown in FIG. 3, the image processing device 1 in FIG. 1 may have a configuration in which a camera unit 2 (including the camera 4, image input means 5 which takes in an image from the camera 4, and an I/F 42 which outputs the read image), and a processing unit 3 (including an I/F 43 which inputs an image from the camera unit 2, a memory 9 which stores the taken-in image, a CPU 6 which performs processing of the taken-in image, and a ROM 7 which stores an image processing program for processing an image in the CPU 6) separately perform processing, and an image input from the camera unit 2 is processed in the processing unit 3. Hereinafter, the configuration in FIG. 2 will be described as an example. The camera 4 is installed, for example, in the vicinity of a rearview mirror in a vehicle so that the front of the vehicle is reflected.

The image processing device 1 is configured by the camera 4 as the imaging device, the CPU 6 as processing means for processing an image which is imaged using the camera 4, the memory 9 as recording means for the CPU 6 which stores the image, and a processing result which is processed in the CPU 6, the ROM 7 as recording means of the image processing program for performing processing in the CPU 6, and image input means 5 for controlling the camera 4 and taking in an image, and these are connected to each other by a bus 11. However, this configuration is not essential, and the device may have a configuration in which the device is further equipped with an image processing LSI in addition to the CPU 6, and a part of processing is processed in a dedicated LSI, or a plurality of memories such as a RAM for the image processing LSI is used, instead of using only one memory.

The camera 4 of the image processing device 1 is equipped with imaging elements of, for example, a CCD or a CMOS. In addition, the image processing device 1 and the control device 13 are connected to each other using communication means 12 such as a CAN (Controller Area Network), and are able to transmit a processing result, or the like, of the image processing device 1 to each other.

The image processing device 1 calculates controlled variables or the like of a target vehicle speed, deceleration, acceleration, an accelerator, and a brake for following-up a preceding vehicle from an image of the preceding vehicle in the image which is imaged using the camera 4, and transmits the calculated result to the control device 13. The control device 13 receives a signal transmitted by the image processing device 1, sends an instruction to the actuator of the brake or the accelerator which is not shown, and controls speed of the vehicle. However, the image processing device 1 may have a configuration in which an amount of change (magnification ratio) of the magnitude of an area of the preceding vehicle on the image is obtained instead of the controlled variables or the like of the target vehicle speed, the deceleration, the acceleration, the accelerator, and the brake, the result is sent to the control device 13, and the controlled variables or the like of the target vehicle speed, the deceleration, the acceleration, the accelerator, and the brake are calculated in the control device 13.

The image processing device 1 to which the invention is applied is stored with an image processing program relating to the embodiment in the ROM 7 in order to execute these, and a series of functions for processing the image is executed by executing these programs using the CPU 6 when power is turned on. As shown in the functional block diagram of the image processing device 1 in FIG. 1, the image processing device 1 is assumed to function as an image processing unit 20, a reference image setting unit 21, a comparison unit 22, and a controlled variable calculation unit 23.

The image processing unit 20 in FIG. 1 has functions of specifying an area of the preceding vehicle in the image which is imaged using the camera 4 as the imaging device, setting an image of the area of the preceding vehicle as the reference image area at a time t in which a tracking control is started, and setting the image of the area of the preceding vehicle as the comparison image area at a time t+N after a predetermined time. However, the unit may have a configuration in which the setting of the reference image is manually performed using a touch panel, an external interface, or the like.

The reference image setting unit 21 includes a function of maintaining an image in the reference image area which is set in the image processing unit 20 in the memory 9. At this time, the unit may have a configuration in which an image with a magnitude including the reference image area, and coordinates of the reference image area are maintained instead of the image in the reference image area.

The comparison unit 22 has functions of comparing the reference image area at the time t which is stored in the memory 9 by the reference image setting unit 21, or an image therein, to the comparison image area at the time t which is set in the image processing unit 20, or an image therein, and calculating travelling information with the preceding vehicle as the moving object (for example, at least any one of a magnification ratio as a change in magnitude of the image area of the preceding vehicle, a translation amount which denotes a change in position on the image, a distance from the preceding vehicle in a real space, a transversal position of the preceding vehicle, or the like). The comparison unit may have a configuration of directly calculating parameters relating to the deceleration, the acceleration, and turning of the vehicle to be described later, instead of obtaining the magnification ratio of the preceding vehicle area on the image, or the change in position.

The controlled variable calculation unit 23 has a function of calculating a controlled variable (for example, at least one of the target vehicle speed, the acceleration, the deceleration, a target lateral acceleration, a target wheel angle, a target rudder angle, a target yaw rate, or the like of the own vehicle) of the own vehicle from the travelling information (for example, at least one of the magnification ratio of the image area of the preceding vehicle, the translation amount, the movement amount of the preceding vehicle in real space, or the like) which is obtained by the comparison unit 22. In addition, the controlled variable calculation unit may have a configuration in which an instruction value which is sent to the actuator of the accelerator, the brake, and the steering is obtained.

Figure 4:
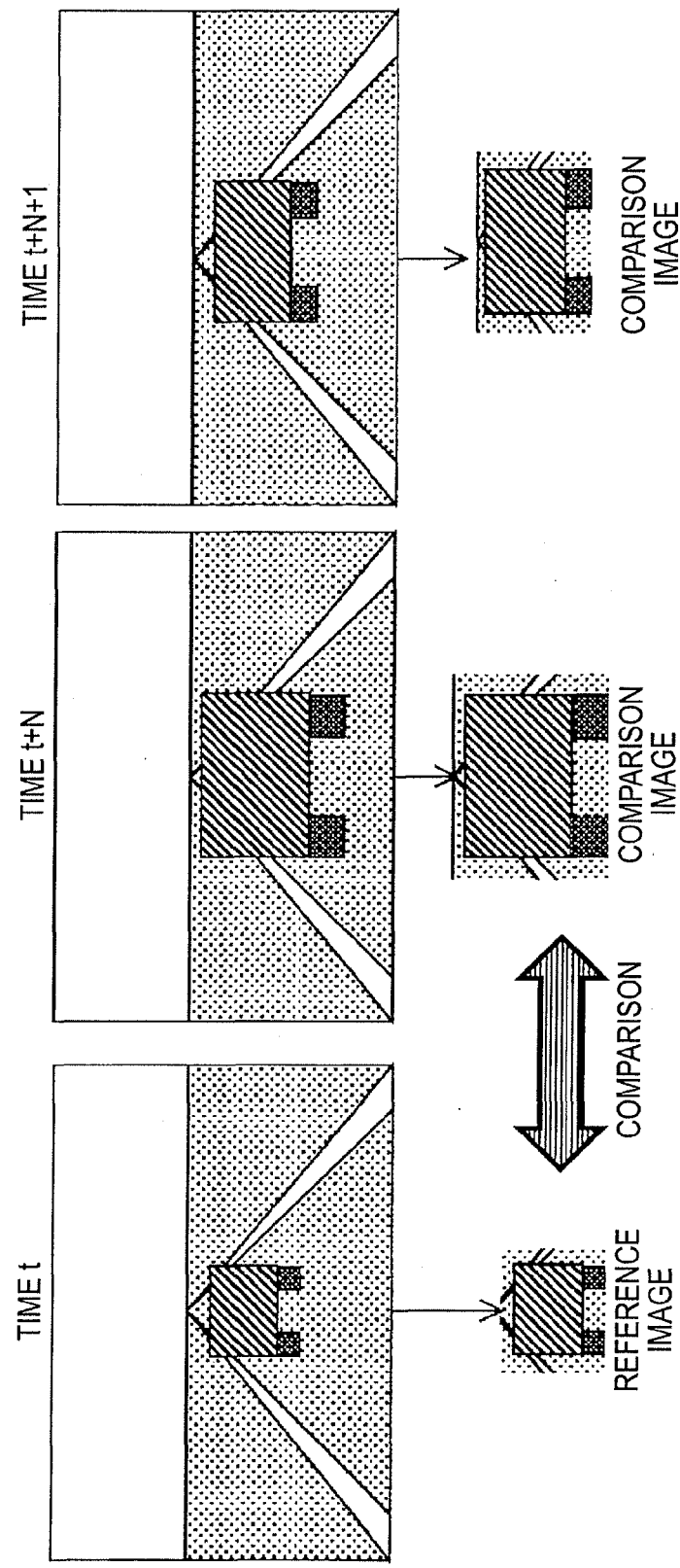
FIG. 4 is a diagram which describes setting of an image area according to a first embodiment of the image processing device in the invention.

By using these functions, as shown in FIG. 4, for example, since the image of the preceding vehicle in the comparison image area is larger (the magnification ratio is less than 1) than the reference image, when the area of the preceding vehicle at the time t is set as the reference image, and the area of the preceding vehicle at the time t+N is set as the comparison image, an image of the comparison area of the preceding vehicle which is obtained at a time t+N+1 becomes smaller than the image at the time t+N, accordingly, it is possible to control the vehicle so as to be similar to the reference image. However, the magnification ratio may be defined so as to be less than 1 when the reference image is larger than the comparison image. Likewise, in a case where the magnitudes of the reference image and the comparison image are equal, it is not essential to make the magnification ratio 1.

As described above, the image processing device 1 which is configured in this manner may perform processing of the image, and calculates information which is necessary for controlling the vehicle when the CPU 6 executes the image processing program. However, as described above, the image processing device may execute a part, or all of the image processing units 20, the reference image setting unit 21, the comparison unit 22, and the controlled variable calculation unit 23 in the camera unit 2.

Here, a flow of a series of processes until the controlled variable is calculated by the image processing device 1 in the above-described image processing device 1 will be described with reference to the flowchart in FIG. 5.

Figure 5:
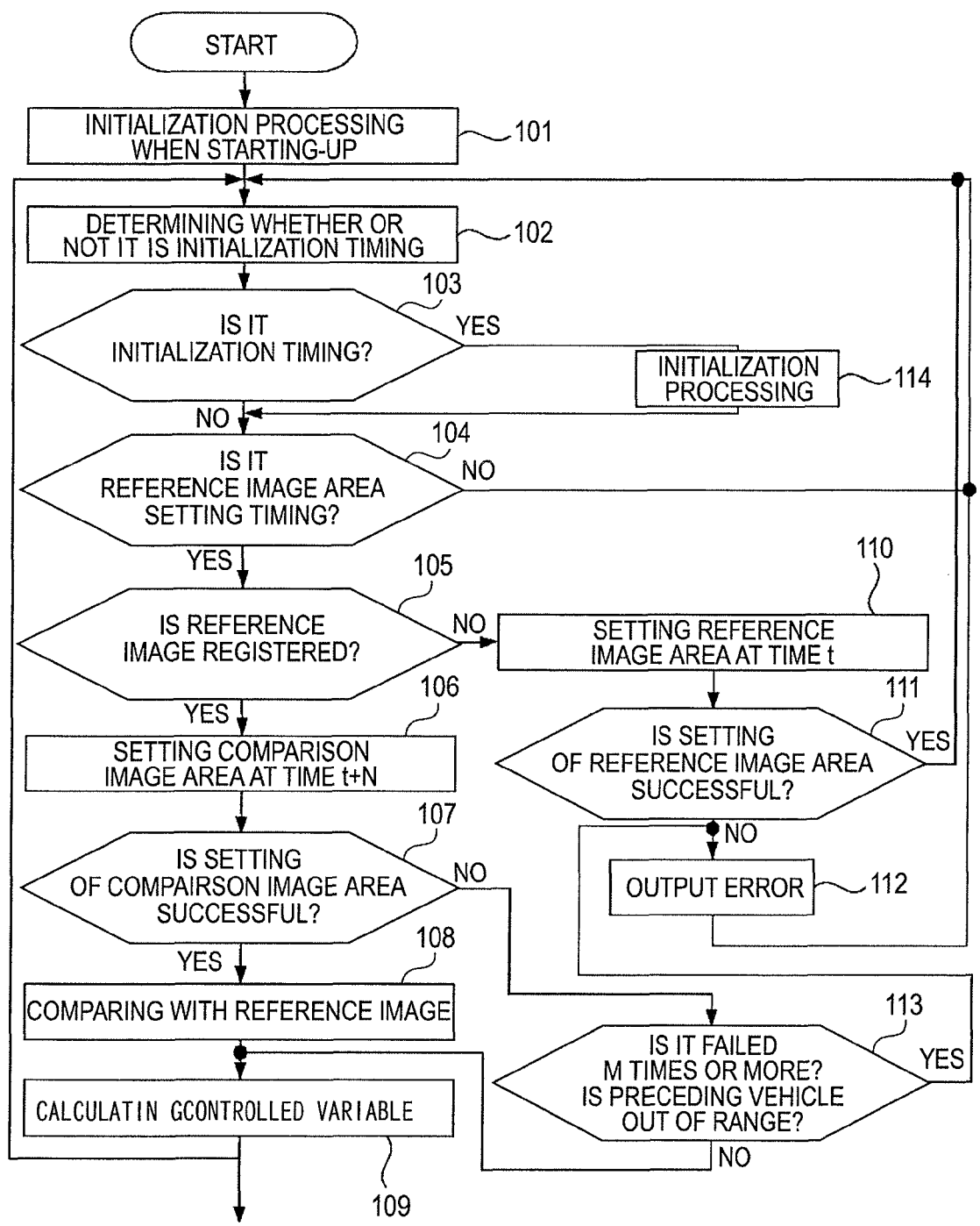
FIG. 5 is a diagram which shows an example of a processing flow according to the first embodiment of the image processing device in the invention.

The series of processes in FIG. 5 is started when the power in turned on, and is repeatedly performed until the power is turned off. Here, an interface may be provided which may operate the start or stop of the program.

First, when the power is turned on, the image processing program is executed by the image processing device 1, and an initialization processing at a time of startup like an initialization of the memory 9 such as the RAM is executed (step 101).

Subsequently, it is determined whether or not it is time to perform initialization during the execution of the image processing program (step 102), and when it is determined to be time to perform initialization in step 103, the process proceeds to step 114, and when it is determined not to be time to perform initialization in step 103, processing in step 104 is executed.

In the initialization processing in step 114, processing of clearing, nullifying, or the like of the reference image area which is set in the image processing unit 20 in the past, and is stored in the memory as a storage unit of the reference image setting unit 21 is performed. In this manner, it is possible to reset the program so as to follow a different vehicle.

In the determination of the initialization timing in step 102, the timing is determined based on the information on whether or not a driver operates a cancel button (not shown) which cancels a tracking of a preceding vehicle, or whether or not the driver steps on the brake. For example, it is determined as the initialization timing when the cancel button is pressed, or the brake is stepped on. In addition, when another vehicle enters between the preceding vehicle and the own vehicle, it is determined as the initialization timing.

In step 104, it is determined whether or not it is time to perform setting of the reference image area. In the processing, it is determined to be time to perform setting of the reference image area, for example, when the driver presses a tracking control start button which is not shown. Even in a case other than the case where the driver presses the tracking control start button, it is determined as time to perform setting of the reference image area, when it is the case where another vehicle enters between the preceding vehicle and the own vehicle during preceding vehicle tracking control, or the like. In addition, when it is determined not to be time to perform setting of the reference image area, the process returns to step 102, and when it is determined to be time to perform setting, the process proceeds to step 105, and whether or not the setting of the reference image area is completed is determined.

In addition, when the setting of the reference image area is completed, an image at the current time (a time in which the time N has passed by from the reference image setting time) is processed, and the image area of the preceding vehicle is specified, and is set as the comparison image area (step 106). However, a time at which the reference image area is set is determined as the time t.

Thereafter, whether or not the setting of the comparison image area is successful is determined in step 107, and when it is successful, the reference image area and the comparison image area are compared to each other (step 108). Detailed comparison method will be described later.

In addition, a controlled variable is calculated based on the result obtained in step 108, and the controlled variable is transmitted to the control device 13 through the communication means 12.

In addition, when it is determined that the setting of the reference image area is not completed in step 105, an image at the present time is processed, and the reference image area is set (step 110). Here, when the setting of the reference image area is successful in step 111, the process returns to step 102, and processing of calculating the controlled variable is sequentially repeated using the set reference image area. When it is determined that the setting of the reference image area fails in step 111, information denoting that the setting of the reference image area is a failure, that is, the setting of the reference image area fails is output. The information is at least one of display information shown on a display, sound information with which a sound is emitted from a speaker, lamp-lighting information of lighting up a lamp, and warning information in which a buzzer is sounded, and due to these, the driver is notified of an error (step 112).

Alternatively, it may be a configuration in which the setting processing of the reference image area is repeatedly performed, and when the setting processing fails a predetermined number of times or more, the driver is notified of the failure. Alternatively, when the setting processing of the reference image area fails, a control of maintaining a constant speed, not the tracking control, or maintaining speed at that time is executed. Alternatively, it may be a configuration in which the control information maintaining the speed of the vehicle to the constant speed or the speed at that time preliminarily is output. At this time, naturally, it may be a configuration in which the failure of setting of the reference image area, that is, at least one of the above-described display information, the sound information, the lamp-lighting information, the warning information, or the like is output, the driver is notified of the error due to these, and the control of maintaining the constant speed is executed.

In addition, when it is determined that the setting of the comparison image area fails in step 107, whether or not the setting fails a predetermined number of times or more (M times or more) in step 103, that is, whether or not the setting of the comparison image area fails a predetermined number of times or more, and whether or not the preceding vehicle as the moving object got out of range due to a right or left turn or the like, that is, whether or not the moving object got out of the range which may be imaged by the imaging device of the own vehicle are determined. When it is determined that the number of failures is M times or less, and the preceding vehicle is not out of the range, a current controlled variable is calculated using at least any one of the past comparison result, and the past calculation result of the controlled variable. That is, the controlled variable which is calculated using the past travelling information which is stored in advance, or the past controlled variable which is stored in advance is output. When the setting of the comparison image area fails a predetermined number of times or more (fails M times or more), or the moving object gets out of the range which may be imaged by the imaging device of the own vehicle (the preceding vehicle is out of the range), the process proceeds to step 112. Information denoting that the setting of the comparison image area fails, that is, the setting of the reference image area fails is output in step 112. The information is at least one of the display information shown on a display, sound information in which a sound is emitted from the speaker, lamp-lighting information of lighting up a lamp, and warning information in which a buzzer is sounded, and due to these, the driver is notified of the error. Alternatively, it may be a configuration in which the control of maintaining the constant speed is executed instead of the tracking control when the setting processing of the comparison image area fails.

Figure 6:
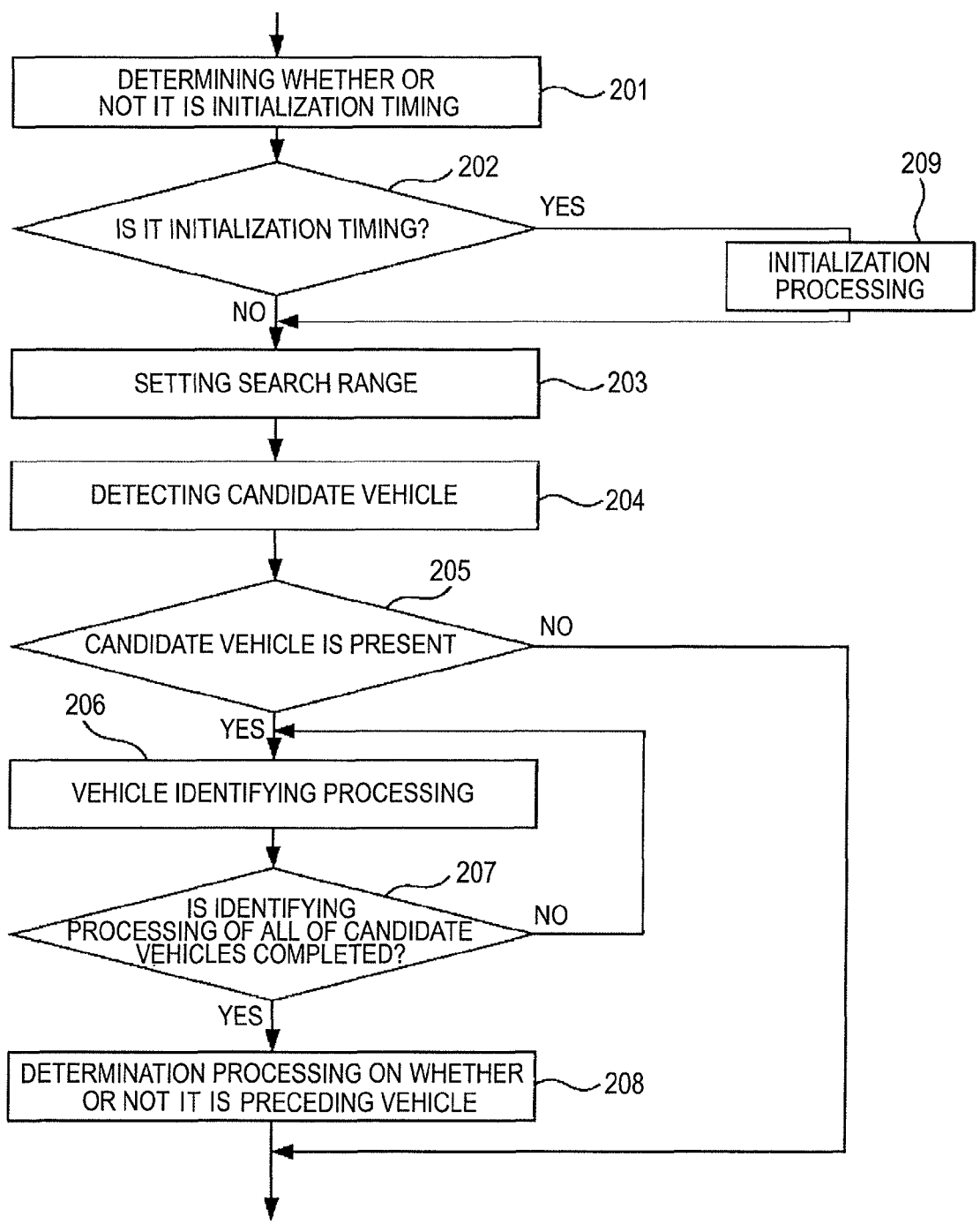
FIG. 6 is a diagram which shows an example of a processing flow of setting a reference image according to the first embodiment of the image processing device in the invention.

Subsequently, a flow of a series of processes of setting the reference image by the image processing device 1 in the above-described image processing device 1, will be described with reference to the flowchart shown in FIG. 6.

First, it is determined whether or not it is the initializing timing in step 201. For example, when it is determined that the own vehicle is largely turned based on the information which is obtained from a steering wheel angle sensor, a yaw rate sensor, or the like, which is not shown, it is determined as the initialization timing, and when a turning amount is a predetermined amount or less, it is not determined as the initialization timing.

When it is not the initialization timing in step 202, the process proceeds to step 203, and a search range of detecting a candidate of preceding vehicle is set. When it is the initialization timing, the process proceeds to step 209, and the search range of detecting the candidate of preceding vehicle, or the like, is initialized.

In addition, the inside of the search range is scanned using, for example, a well-known technology such as template matching, and the candidate vehicle is detected (step 204). At this time, it is possible to cut an area of the candidate vehicle out from an edge which is obtained using a differential value from adjacent pixels, or information of brightness value of each pixel.

Thereafter, when it is determined that the candidate vehicle is present (step 205), whether or not it is a vehicle is identified using well-known technologies such as a support vector machine (SVM), AdaBoost, RealAdaBoost, a Neural Network in step 206. However, at this time, it is also possible to identify the vehicle by comparing an image of the preceding vehicle, or a feature amount which is extracted from the image to a partial image of the current image, in a case where it was possible to detect the preceding vehicle in the past.

Figure 7:
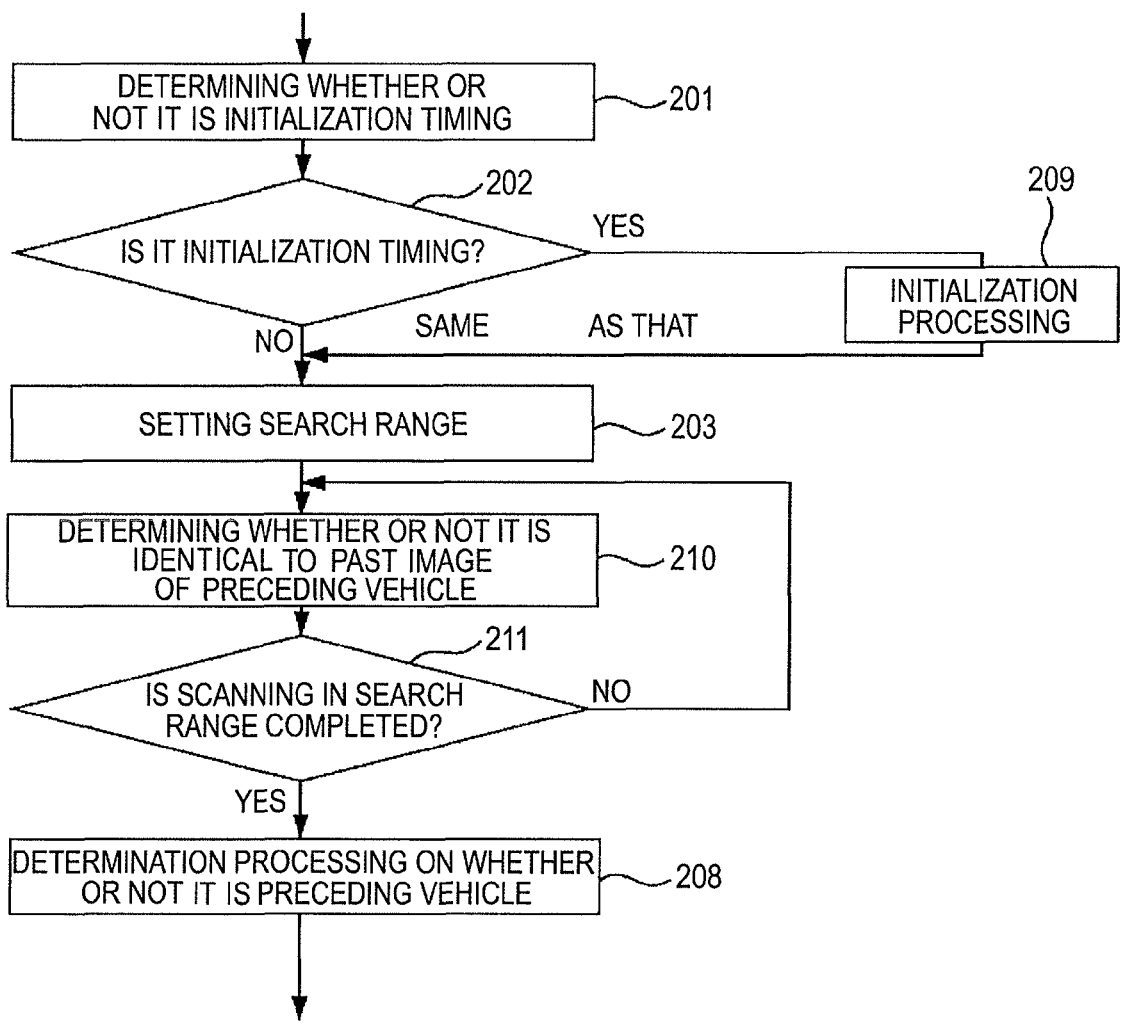
FIG. 7 is a diagram which shows an example of a processing flow of image comparison according to the first embodiment of the image processing device in the invention.

For example, as the flowchart shown in FIG. 7, the partial image is set in the search range, and whether or not the partial image is identical to the past image of the preceding vehicle is determined in step 210. When the scanning in the search range is not completed (step 211), processing in step 210 is repeatedly performed by changing the position and magnitude of the partial image.

When the identification processes all of the candidate vehicles are not completed (step 207), the process returns to step 206. When all of the identification processes are completed, a preceding vehicle as a target of the tracking control is determined since it is determined as a vehicle by the identification process (step 208). In the determination processing of determining whether or not it is the preceding vehicle, whether or not it is the preceding vehicle is determined by determining whether or not the detected vehicle is in the lane mark where the own vehicle is travelling, or whether or not the travelling direction is identical to each other.

In addition, when the candidate vehicle is not present in step 205, processing of detecting the candidate vehicle is omitted.

When it is assumed that the preceding vehicle is detected, an image at a certain time t is set as the reference image, and the comparison image area is set at a time t+N thereafter using the methods described above or the like, for example, a parameter in which a value of the following expression 1 becomes minimal is obtained when comparing the reference image in step 108 to the comparison image.

$$\sum_{i=0}^{M} (I(W(i; z, tx, ty)) - T(i))^2 \qquad \text{Expression 1}$$

Here, T is a brightness value of the reference image, I is brightness of the comparison image, W is a function which transforms the comparison image, z is a magnification ratio, tx is a translation amount (transversal) of a vehicle, ty is a translation amount (vertical) of a vehicle, and M is the number of pixels of the reference image.

When coordinates of the pixel i is i=(x, y), the transformation function W is, for example, $$W(i; p) = \begin{pmatrix} z \cdot x + tx \\ z \cdot y + ty \end{pmatrix} \qquad \text{Expression 2}$$

the magnification ratio z may be values which are different in vertical and transversal directions, and may include parameters such as rotation and shearing. Here, the parameters z, tx, and ty are integrally denoted by p.

A parameter which may transform the comparison image so as to match the reference image is obtained using the expression 1. When the magnification ratio can be obtained, it is possible to determine whether a vehicle is close to the own vehicle, or is far from the own vehicle. The expression 1 can be solved as follows.

The parameter is changed by $\Delta p$ so as to make e smaller. By repeating this, the optimal solution is obtained. That is, processes of describing the expression 1 as the expression 2, obtaining the $\Delta p$, and substituting p+$\Delta p$ for the p are repeated.

$$\sum_{i=0}^{M} (I(W(i; p + \Delta p)) - T(i))^2 \qquad \text{Expression 3}$$

When the expression 3 is applied with a primary taylor expansion, $$\sum_{i=1}^{M} \left[ I(W(i; p)) + \nabla I \frac{\partial W}{\partial p} \Delta p - T(i) \right]^2 \qquad \text{Expression 4}$$

is obtained. When solving the $\Delta p$ by setting the expression 4 is 0, the expression 5 is obtained. That is, it is possible to obtain the $\Delta p$.

$$\Delta p = H^{-1} \sum_{i=1}^{M} \left[ \nabla I \frac{\partial W}{\partial p} \right]^T [T(i) - I(W(i; p))] \qquad \text{Expression 5}$$

Here, H denotes a Hessian matrix, the suffix −1 denotes an inverse matrix, and the suffix T denotes a transposed matrix.

However, the parameter to be obtained may be a parameter relating to speed of own vehicle such as the deceleration, the acceleration, the target vehicle speed, the distance between vehicles, or the like of the own vehicle instead of the magnification ratio. This can be executed by causing a two-dimensional transformation of the image and the movement of the own vehicle to correlate with each other, and formulating thereof, since an enlargement, or a reduction of image of a preceding vehicle is correlated with the vehicle speed of the own vehicle, the deceleration, the acceleration, and the distance between vehicles. In addition, the parameter may be parameters relating to turning of the own vehicle such as the yaw rate of the own vehicle, the lateral acceleration, a turning radius, the steering wheel rudder angle, the wheel angle, or the like, instead of the translation amount (tx, ty) of the vehicle. For example, the transformation function W is set as the expression 6.

$$W(i; p) = \begin{pmatrix} \frac{D + (v + a \cdot t) \cdot t}{D} \cdot x + tx \\ \frac{D + (v + a \cdot t) \cdot t}{D} \cdot y + ty \end{pmatrix}$$ Expression 6

Here, the p is configured by D, v, a, tx, and ty, and the D denotes a distance between vehicles, the v denotes relative speed, the a denotes the acceleration of the own vehicle, and the t denotes a short time (for example, 0.5 secs, 1 sec, 2 secs, 3 secs, or the like).

In addition, when it is a tracking control of a case where the distance between vehicles is constant, the reference image may be fixed, however, when it is desired to change the distance between vehicles, the reference image is updated, or the reference image is also subject to an image transformation such as enlargement. For example, when the reference image is enlarged, and is compared to the comparison image, the distance between vehicles becomes short, and when the reference image is reduced, and is compared to the comparison image, the distance between vehicles becomes long.

By adopting the above-described invention, it is possible to provide an image processing device in which a precise parameter is obtained from a minute change in an image, and a tracking control of a preceding vehicle with high precision can be executed using only the image information from the imaging device.

The above-described method has been described relating to a camera in which one camera is used, however, it is obvious that the embodiment may be applied to a case where two or more cameras are used. When the embodiment is applied to stereo cameras which use two cameras, setting of the reference image, or the comparison image becomes easy, and it is possible to control vehicles by using a three-dimensional measurement result of the stereo cameras in combination. In addition, embodiments regarding vehicles have been described, however, it is possible to apply the invention to moving objects such as a robot, or construction machinery such as a dump truck.

In addition, when the setting of the reference image, or the setting of the comparison image fails, it is possible to determine whether or not the driver is travelling using the tracking control, and to improve the safety of control by informing the driver of the failure. Further, it is advantageous in that, when the setting of the comparison image fails, it is possible to execute the tracking control of the preceding vehicle, and a control of maintaining the constant speed using only the invention by performing the control of maintaining the constant speed, and to perform a control in a case where a preceding vehicle is not present, or the like.

Second Embodiment

A second embodiment of the invention will be described in detail with reference to drawings.

In the first embodiment, the example of applying the invention to the tracking control of the preceding vehicle has been described, however, it is possible to perform a control of maintaining the lane mark by using road surface paint which is present continuously, and intermittently such as a lane mark of a road.

That is, the second embodiment is configured by including, an image processing unit 20 which detects a lane mark on the road from an input image, sets an area of the detected lane mark as the reference image area, and sets an area of the lane mark after a predetermined time as a comparison image area; a comparison unit 22 which compares the set reference image area and the comparison image area with each other, and calculates a translation component of the image and a rotation parameter of the image; and a controlled variable calculation unit 23 which calculates a controlled variable of turning of the own vehicle from a translation component of the image, and the rotation parameter of the image which are calculated in the comparison unit 22.

Figure 8:
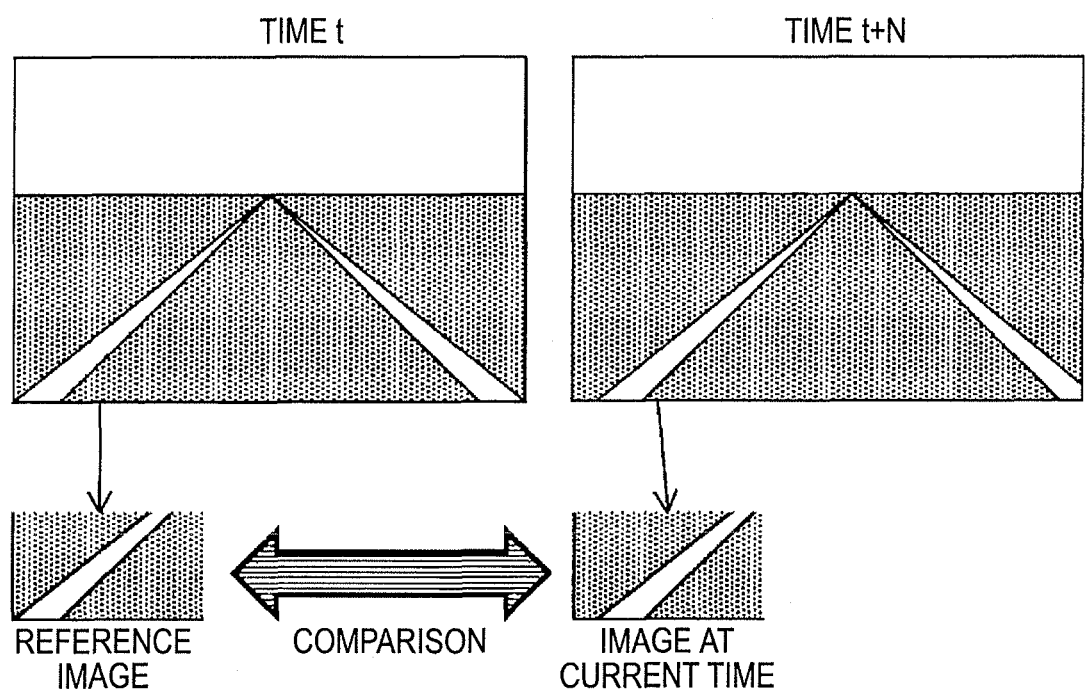
FIG. 8 is a diagram which describes setting of an image area according to a second embodiment of the image processing device in the invention.

Specifically, as shown in FIG. 8, an image of a lane mark at a certain time t is set as the reference image, and an image of the lane mark at a time t+N thereafter is set as the comparison image. When the own vehicle travels in parallel to the lane, usually the lane mark is imaged at the same position, however, when the own vehicle leans to one side, and becomes not parallel to the lane mark in the travelling direction, the lane mark is imaged at a different position.

According to the embodiment, in the processing in step 108, for example, the parameter p in the expression 2 is set as the translation components of the image tx, and ty, and the rotation parameter θ of the image, thereby obtaining tx, ty, and θ. In addition, a controlled variable f turning of the vehicle is obtained from the tx, ty, and θ which are obtained in step 109.

Alternatively, it is possible to calculate the controlled variable of turning of the own vehicle such as a yaw rate, a lateral acceleration, a turning radius, a steering wheel rudder angle, a wheel angle, and an angle of the vehicle or the camera in the vertical direction (pitching), by incorporating the controlled variable of turning of the own vehicle such as the yaw rate, the lateral acceleration, the turning radius, the steering wheel rudder angle, the wheel angle, and the angle of the vehicle or the camera in the vertical direction (pitching) in the transformation function W of the image, and formulating thereof.

For example, when the parameter p is assumed to be configured by the rotation parameter θ of the image, and tx and ty, the transformation function W becomes the expression 7.

$$W(i; p) = \begin{pmatrix} \cos\theta \cdot x - \sin\theta \cdot y + tx \\ \sin\theta \cdot x + \cos\theta \cdot y + ty \end{pmatrix}$$ Expression 7

Even in this second embodiment, similarly to the first embodiment, it is possible to provide an image processing device in which a precise parameter is obtained from a minute change in an image, and a tracking control of a preceding vehicle with high precision can be executed using only the image information from the imaging device.

In addition, in the above-described method, a camera in which one camera is used been described, however, it is obvious that the embodiment may be applied to a case where two or more cameras are used. When the embodiment is applied to stereo cameras which use two cameras, setting of the reference image, or the comparison image becomes easy, and it is possible to control vehicles by using a three-dimensional measurement result of the stereo cameras in combination. In addition, embodiments regarding vehicles have been described, however, it is possible to apply the invention to moving objects such as a robot, or construction machinery such as a dump truck.

In addition, the magnification ratio, the translation amount, the rotation, and the shearing of the image have been described, however, obviously, it is possible to use other affine transformation parameters which transform a square image into a trapezoidal image.

What is claimed is:

1. An image processing device which performs a tracking control based on a controlled variable of an own vehicle with respect to a moving object, the device comprising:
    an image processing unit which specifies an area of the moving object from an input image, sets the specified area of the moving object as a reference image area after starting the tracking control, and sets an area of the moving object as a comparison image area at a time after the specified area is set;
    a comparison unit which compares the set reference image area and the comparison image area, and calculates travelling information relating to the moving object; and
    a controlled variable calculation unit which calculates the controlled variable of the own vehicle from travelling information which is calculated in the comparison unit;
    wherein, when it is determined that the setting of the comparison image area fails, the image processing unit determines whether or not setting of the comparison image area fails a predetermined number of times or more, and whether or not the moving object is out of a range to be imaged in the imaging device of the own vehicle;
    wherein the controlled variable calculation unit outputs the controlled variable which is calculated using the past travelling information stored in advance, or the past controlled variable which is stored in advance, when it is determined that the setting of the comparison image area does not fail a predetermined number of times or more and determined that the moving object is not out of the range to be imaged in the imaging device of the own vehicle; and
    wherein the controlled variable calculation unit outputs information denoting a failure when the setting of the comparison image area fails the predetermined number of times or more, or the moving object gets out of the range which may be imaged by the imaging device of the own vehicle.

2. The image processing device according to claim 1, wherein the travelling information relating to the moving object is at least one of a magnification ratio which denotes a ratio of change in magnitude of an image area of the moving object, a translation which denotes a change in position on an image, a distance between vehicles from a preceding vehicle, a transversal position of the preceding vehicle, relative speed between the preceding vehicle and the own vehicle, and an acceleration of the own vehicle.

3. The image processing device according to claim 1, further comprising:
    a reference image setting unit which stores an image corresponding to the reference image area which is set in the image processing unit in a storage unit.

4. The image processing device according to claim 1, wherein the controlled variable of the own vehicle is at least one of vehicle speed, the acceleration, the deceleration, a lateral acceleration, a wheel angle, a steering angle, and a yaw rate of the own vehicle.

5. The image processing device according to claim 1, wherein the image processing unit outputs information denoting that setting of the reference image area fails, when it is determined that the setting of the reference image area fails.

6. The image processing device according to claim 5, wherein the information denoting that the setting of the reference image area to be output fails is at least one of display information shown on a display, sound information in which a sound is emitted from a speaker, lamp-lighting information of lighting up a lamp, and warning information in which a buzzer is sounded.

7. The image processing device according to claim 5, wherein the information denoting that the setting of the reference image area to be output fails is control information which maintains the speed of the own vehicle to a predetermined speed, or to speed at a time point in which the information is denoted.

8. The image processing device according to claim 5, wherein the information denoting that the setting of the reference image area to be output fails includes at least one of display information shown on a display, sound information in which a sound is emitted from a speaker, lamp-lighting information of lighting up a lamp, and warning information in which a buzzer is sounded, and control information which maintains the speed of the own vehicle to a predetermined speed.

9. The image processing device according to claim 1, wherein the image processing unit scans an inside of a search range from an input image, detects a candidate moving object, identifies whether or not it is a moving object from the detected candidate moving object, and determines whether or not it is a moving object as a target of the tracking control from the identified moving object.

* * * * *